United States Patent [19]
Sedlock

[11] 3,913,716
[45] Oct. 21, 1975

[54] WELDED FRICTION ARTICLE AND METHOD OF ASSEMBLY

[75] Inventor: Daniel T. Sedlock, Bedford, Ohio

[73] Assignee: Abex Corporation, New York, N.Y.

[22] Filed: Apr. 4, 1974

[21] Appl. No.: 457,950

[52] U.S. Cl. .......... 192/107 R; 188/218 XL; 219/93
[51] Int. Cl.² ........................................ F16D 13/60
[58] Field of Search ........ 219/93; 188/218 XL, 240, 188/241, 250 G, 73.2; 192/107 R, 107 M, 107 T

[56] References Cited
UNITED STATES PATENTS

| | | | |
|---|---|---|---|
| 3,037,860 | 6/1962 | Masterson et al. | 192/107 M |
| 3,064,782 | 11/1962 | Bois | 192/107 R |
| 3,209,876 | 10/1965 | Kraft | 192/107 R |
| 3,485,331 | 12/1969 | Volker et al. | 192/107 M |
| 3,685,623 | 8/1972 | Bradshaw | 192/107 R |
| 3,774,009 | 11/1973 | Hodges | 219/93 X |

Primary Examiner—Benjamin W. Wyche
Attorney, Agent, or Firm—David A. Greenlee; Thomas S. Baker, Jr.

[57] ABSTRACT

A friction article includes an apertured carrier plate having a plurality of friction pads mounted on either side. Each pad has a friction facing and a steel backing plate having an integrally formed button and projection. A pair of pads are placed on either side of a carrier plate with their button projections contacting within the aperture. This assembly is placed in a resistance welder with one backing plate spaced from the carrier plate. A pair of electrodes squeeze and pass current through the pads to effect a resistance weld of the projections until both backing plates are clamped to the carrier plate.

10 Claims, 8 Drawing Figures

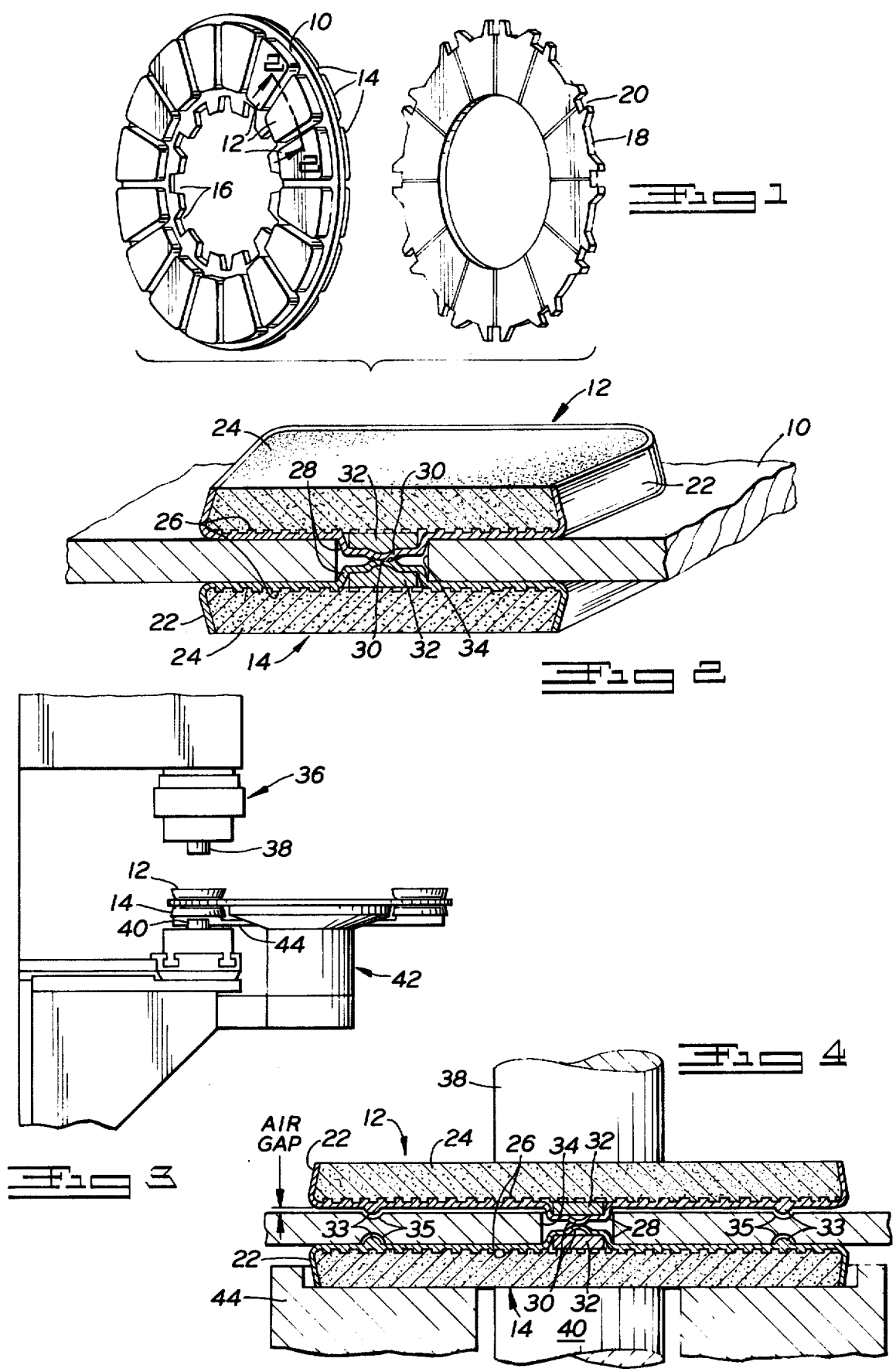

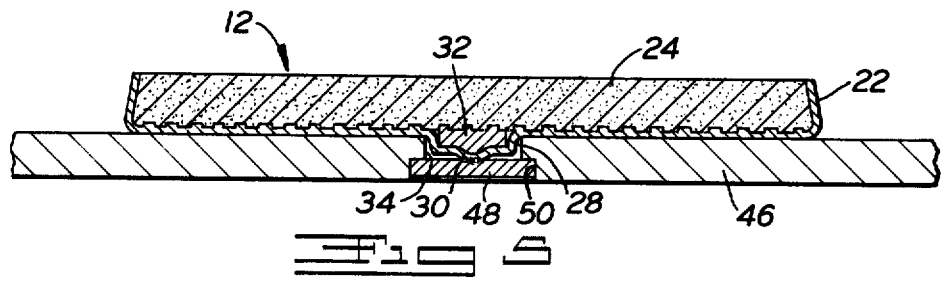
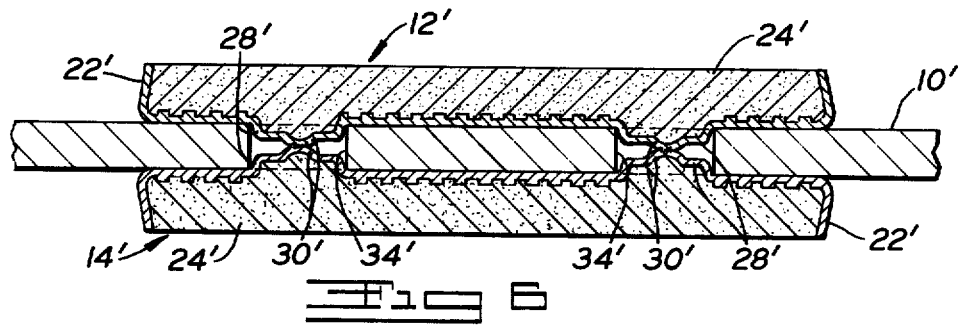
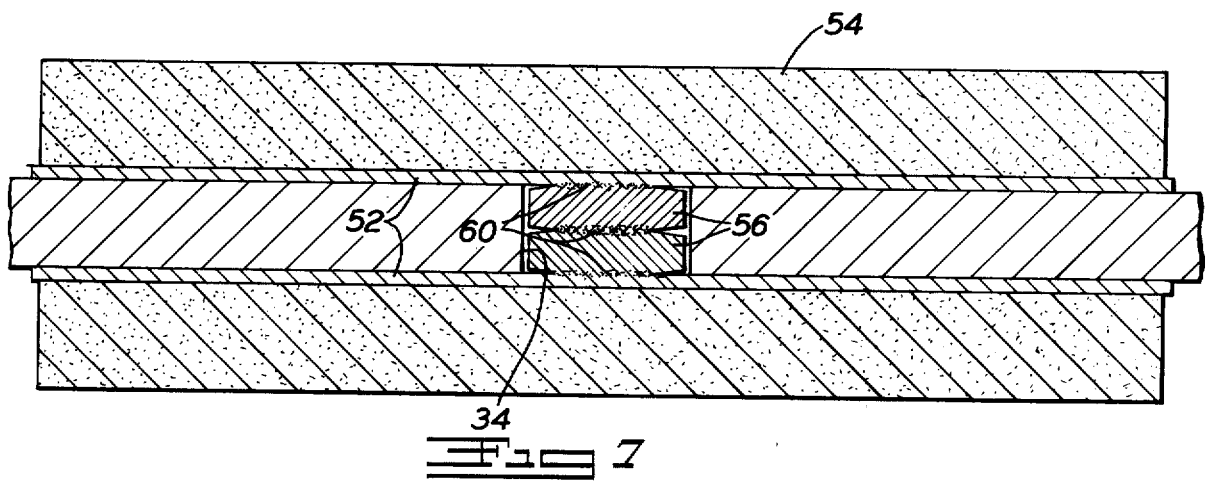
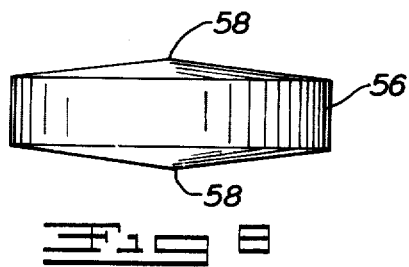

WELDED FRICTION ARTICLE AND METHOD OF ASSEMBLY

This invention relates generally to friction articles and more specifically to such an article comprising a carrier plate mounting pairs of friction pads on either side which are welded together through an aperture in the carrier plate.

In disc brakes or clutches, such as aircraft brake assemblies, a plurality of double friction-faced carrier plates are alternately interleaved with steel or friction-faced mating plates. By squeezing a plurality of these plates together, braking is effected.

In conventional assemblies, each carrier plate mounts a plurality of pairs of arcuately spaced friction devices or pads which are riveted together through an aperture in the carrier plate. Each pad comprises a metal cup or backing plate which mounts a block of sintered metallic friction material. To enable riveting, a hole is provided in the backing plate and a larger diameter rivet access hole is left in the friction block. An arrangement of this type is shown in U.S. Pat. No. 2,916,123 — Garmager. When the friction facings are sufficiently worn, the rivets are punched or drilled out to free the worn pads from the carrier plate, to which new pads are riveted. Thus, expensive machined carrier plates may be reused many times by replacing the relatively inexpensive friction pads.

One problem with such an arrangement is that the rivet access holes reduce the amount of friction material per pad, thus increasing the size and weight of a given friction assembly for a given required braking force. Another problem is that such discontinuous friction surface causes edge crumble adjacent the rivet access hole. The edge crumble increases with wear, causing further decrease in friction contact area and reducing braking efficiency.

In an attempt to overcome these problems, it has been proposed in U.S. Pat. No. 3,685,623 — Bradshaw to eliminate the rivet access hole by providing a blind rivet arrangement. Although this provides a continuous friction surface and solves the edge crumble problem, it is expensive and requires either two different types of pads or extra parts, both of which entail inefficient original and replacement assembly operations and raise the cost per assembly.

A completely different type of assembly is suggested by U.S. Pat. No. 3,020,643 — Williamson wherein friction material is welded directly to a backing. This provides a continuous friction facing, but renders replacement impossible.

It is therefore an object of this invention to provide friction pads having a continuous friction facing which may be inexpensively and easily mounted in identical pairs on a carrier plate. It is a further object to provide friction pads which can be readily removed and replaced when the friction facings become worn.

In accordance with the foregoing objects, a pair of friction pads, each having a continuous friction facing, are mounted together on an apertured carrier plate. Each pad has a backing plate that includes a projection extending into the aperture where abutting projections are resistance welded together. More specifically, this invention consists of a friction article comprising a carrier plate having an aperture therein, a friction device including a backing plate having a compacted friction material mounted thereon, and means mounting the backing plate to one side of the carrier plate, comprising a mounting button located in the aperture, said button having a first connection to a member mounted on the opposite side of the carrier plate and a second connection to the backing plate, one of said connections being a resistance projection weld for mounting the friction device in contact with the carrier plate, the resistance projection welded area being smaller than the aperture.

A complete understanding of this invention may be obtained by reference to the following detailed description of the attached drawings, wherein:

FIG. 1 is an exploded perspective view of a portion of a disc brake assembly;

FIG. 2 is an enlarged perspective sectional view taken along lines 2—2 of FIG. 1, illustrating a preferred embodiment of this invention;

FIG. 3 is schematic view of manufacturing apparatus for this invention;

FIG. 4 is an enlarged fragmental view of a portion of FIG. 3, showing the FIG. 2 embodiment prior to welding;

FIG. 5 is a sectional view similar to FIG. 2, showing another embodiment of this invention;

FIG. 6 is a view similar to FIG. 5, showing yet another embodiment of this invention;

FIGS. 7 and 8 show a still further embodiment of this invention.

Referring now to FIG. 1, a friction couple of a disc brake assembly comprises a carrier plate 10 having a plurality of pairs of identical friction devices or pads 12, 14 arcuately spaced and mounted on either sides thereof and includes a plurality of internal notches 16 for attachment to a stationary splined shaft, not shown. To effect braking, the carrier plate 10 is squeezed, by means not shown, against a mating plate 18 to engage pads 14 therewith. Plate 18 includes a plurality of external notches 20 for connection to a rotating member, such as an aircraft wheel, not shown.

As shown in FIG. 2, pads 12, 14 each include a stamped steel backing plate or cup 22 which supports a block of sintered copper alloy or other metallic friction material 24. Block 24 is secured by a cold coining process to a mesh 26 carried by the bottom of cup 22. Each cup 22 includes a stamped integral deformation or button 28 having an integral projection 30 much smaller than the button. To provide for stability of the block 24 during braking, a steel filler plug 32 is placed in the button 28 prior to introduction of friction material into the cup.

Pads 12, 14 are arranged on either side of plate 10 with their buttons 28 extending into a plate aperture 34. Buttons 28 and aperture 30 have substantially the same diameter to prevent lateral sliding of the pads 12, 14 on plate 10. Conventional antirotation buttons 33 and plate apertures 35 may be provided in cup 22 and plate 10, respectively, to prevent rotation of pads 12, 14 relative to plate 10 (see FIG. 4). Cups 12 and 14 are secured together by a resistance weld of projections 30, the weld having an area much smaller than aperture 34 to assure no bonding to plate 10.

Assembly of the friction article will now be described with reference to FIGS. 3 and 4. An electric welder 36 includes upper and lower electrodes 38, 40. An indexing tooling arrangement 42 is mounted on the welder and includes a rotatable base 44 which is apertured to receive the lower electrode 40.

The assembly procedure is as follows. A pad 14 is located on base 44 face down. The carrier plate is located so that button 28 projects into aperture 34. A pad 12 is then placed over the carrier plate with its button 28 projecting into aperture 34 so that the projections 30 abut. It is important that each cup 22 is formed so that the projection 30 extends from the cup back a distance greater than half the depth of aperture 34 or (thickness of the carrier plate) so that cup 12 is initially spaced above carrier plate 10 to form an air gap between the top of plate 10 and the back of cup 12.

Electrode 38 is then brought into contact with the face of block 24. Current is passed through electrode 38, upper block 24, filler plug 32, button 28, and upper projection 30 to lower projection 30, button 28, plug 32, lower block 24 and lower electrode 40. Substantially simultaneously, pressure is applied to electrode 38 to gradually force the upper cup 22 into contact with plate 10 during fusion of projections 30. Upon contact, current is cut off, the weld cools, and the tooling is indexed to assemble another pair of pads 12, 14 to plate 10 in the same manner. It is to be noted that the pads 12, 14 are only welded together and have no bond to plate 10. This is necessary for eventual replacement of pads 12, 14 as later described.

It is readily apparent that the characteristics of the welding cycle will vary with the materials welded and the size of the weld. This can easily be determined by anyone skilled in the welding art. Any projection welder, many of which are commercially available, can be utilized for this process.

After the friction facings, comprising pads 12 and 14, are sufficiently worn, the following procedures may be used to replace worn pads with new pads. In one form, a chisel is placed between carrier plate 10 and cup 22 and struck with a hammer to shear off button 28. Since the only connection between the cups is the weld connecting projections 30, this will cause both pads to separate from the carrier plate. Another disassembly method is to either punch or drill out the weld through blocks 24, buttons 28 and aperture 34. Again, because the welded area is much smaller than aperture 34, total disassembly will be quickly accomplished. After disassembly, the same resistance welding technique described above may be utilized to provide carrier plate 10 with facings of new pads 12, 14.

The same welding technique may be used to mount friction pads on only one side of a disc brake assembly end plate 46, as shown in FIG. 5. To accomplish this, the assembly technique is substantially the same except that, instead of welding projections from two pads together, the projection 30 is welded to a retainer member 48 located in a counterbore 50 on the other side of end plate 46.

In some instances it is desirable to provide two welded connections between a pair of pads, eliminating the antirotation buttons 33 and depressions 35. FIG. 6 shows such an arrangement wherein the cups 22' each have a pair of buttons 28' and projections 30' which are welded together in a pair of apertures 34' in a plate 10'. FIG. 6 further shows a modification wherein a hot forge process has been used to fill cup 22 with a block of friction material 24. Thus the friction material completely fills the button 28 and eliminates any need for a filler plug.

FIGS. 7 and 8 disclose yet a further embodiment of this invention. Here the friction pad comprises a flat backing plate 52 with a block of friction material 54 mounted thereon. Instead of having integral buttons and projections, a pair of welding intermediaries in the form of generally cylindrical buttons 56 having a pair of conical tips 58 are provided. Each button 56 has one of its tips 58 previously welded to each backing plate 52, leaving one free tip 58 spaced from the backing plate a distance greater than half the depth of aperture 34 so that, during assembly, the buttons will space an upper backing plate above the carrier plate to form the air gap necessary for the welding technique described above. In this embodiment, pressure and current will flow through the upper friction material block 54, backing plate 52, button 56 and contacting tips 58 to fuse both button tips together in a weld 60. Of course, a single button of greater thickness could be used and which would be welded to both backing plates during this assembly. Again, as with the above embodiments, the pads can be readily removed by punching, drilling or chiseling, as described above. The carrier plate can then again be refaced by the same welding technique.

Thus this invention provides an improved friction article and method of assembly thereof, whereby friction pads having a continuous friction facing can be quickly mounted on a carrier plate and can easily be replaced when worn. This is accomplished by providing a button of substantially the same size as the carrier plate aperture and which interconnects the pad with a member on the other side of the plate, utilizing resistance projection welding.

While several embodiments have been disclosed and described, further modifications may fall within the scope and spirit of this invention.

I claim:

1. A friction article comprising a carrier plate having a mounting aperture formed therein, a pair of friction devices having outer friction faces and inner mounting faces contacting opposite sides of the carrier plate and clamping the carrier plate therebetween, and means connecting the friction devices together through the aperture including a projection smaller than the aperture extending into the aperture from both inner faces into mutual contact, said projections being resistance projection welded together to provide the sole means mounting both friction devices into clamping relation with the carrier plate.

2. The friction article of claim 1 where, in the friction devices, the outer faces comprise compacted friction material and the inner faces each comprise a metal backing plate, the backing plates being deformed to provide the projections.

3. The friction article of claim 2, wherein the backing plates are deformed to provide a button of substantially the same size as the aperture and extending inwardly thereof, the projections being integrally formed on the buttons and extending from the backing plate a distance greater than half the thickness of the carrier plate prior to welding.

4. A friction article comprising a carrier plate having an aperture therein, a friction device including a backing plate having compacted friction material mounted thereon, and means mounting the backing plate to one side of the carrier plate in contact therewith, comprising a mounting button located in the aperture, said button having a first connection to a member mounted on the opposite side of the carrier plate and a second connection to the backing plate, one of said connections being a resistance projection weld for mounting the friction device into clamping contact with the carrier plate, the resistance projection welded area being smaller than the aperture and providing the sole means mounting the friction device to the carrier plate.

5. The friction article of claim 4, including a second identical friction device mounted on the opposite side of the carrier plate, wherein the first connection is a projection on the button which is a resistance projection welded connection to the second friction device, and the second connection is a projection on the button which is resistance projection welded to the first said backing plate.

6. The friction article of claim 4, wherein the second connection comprises an integral deformation of the backing plate forming the button of substantially the same size as the aperture and an integral projection of reduced size extending from the button, and the second connection comprises a member carried by the carrier plate which is resistance projection welded to the projection.

7. The friction article of claim 4, wherein the first connection comprises a second identical friction device mounted on the other side of the carrier plate, a second button resistance projection welded to the second backing plate and to the first said button.

8. The friction article of claim 4, wherein the second connection comprises an integral deformation of the backing plate forming the button and an integral projection of reduced size extending therefrom, and the second connection comprises a second identical friction device mounted on the other side of the carrier plate and having its projection resistance welded to the first said projection, the welded area being smaller than the aperture.

9. A method of assembling a pair of friction devices, each having a friction facing supported by a metal backing plate, to an apertured carrier plate, comprising the steps of forming an integral button on the metal backing plate of each friction device of substantially the same size as the aperture, forming an integral projection on each button which is of substantially smaller size than the button and which extends from the backing plate a distance greater than half the depth of the aperture, positioning one backing plate on one side of the carrier plate with its button projecting into the aperture, positioning the other backing plate on the other side of the carrier plate in spaced relation and with its button projecting into the aperture, engaging the button projections under pressure, and substantially simultaneously passing a current through the friction devices until both backing plates engage the carrier plate, thus fusing the button projections together in a resistance projection weld and clamping the carrier plate between the backing plates.

10. A method of assembling a friction device, having a friction facing supported by a metal backing plate, to an apertured carrier plate, comprising the steps of providing a metal surface on one side of the carrier plate covering the aperture, providing a weldable metallic intermediary within the aperture so sized as to be laterally immobile therein and having a projection substantially smaller than the aperture contacting said metal surface and so dimensioned to space the backing plate from the carrier plate when the backing plate is positioned on the other side of the carrier plate, applying pressure to the backing plate and to the metal surface and substantially simultaneously passing a current through the backing plate, weldable intermediary, projection and metal surface, until the backing plate contacts the carrier plate, to fuse the intermediary projection to the surface in a resistance projection weld smaller than the aperture and thus mount the friction device in clamping contact with the carrier plate.

* * * * *